United States Patent [19]

Ito et al.

[11] 4,068,547
[45] Jan. 17, 1978

[54] TAIL STOCK

[75] Inventors: Teruyuki Ito, Nagoya; Tadashi Yamauchi, Kariya, both of Japan

[73] Assignee: Toyoda-Koki Kabushiki-Kaisha, Japan

[21] Appl. No.: 762,932

[22] Filed: Jan. 26, 1977

[30] Foreign Application Priority Data

Apr. 2, 1976 Japan .......................... 51-39582[U]

[51] Int. Cl.² ........................................... B23D 23/00
[52] U.S. Cl. ........................................ 82/31; 51/236
[58] Field of Search ........................... 82/31; 51/236

[56] References Cited

U.S. PATENT DOCUMENTS 2,860,538  11/1958  Bruet .................................... 82/31
3,867,856  2/1975  Ota ...................................... 82/31

Primary Examiner—Harrison L. Hinson
Attorney, Agent, or Firm—Oblon, Fisher, Spivak, McClelland & Maier

[57] ABSTRACT

A tail stock for compensating for the tapering of a workpiece comprises a center sleeve slidably and rotatably mounted in a housing and provided with a bore with a predetermined eccentricity for holding a center. An arm is secured at one end thereof to the center sleeve. A cylindrical member is mounted in the housing, being slidable in a direction perpendicular to the sliding direction of the center sleeve, and abuttingly engaging one side surface of the other end of the arm. A feed screw shaft is rotatably mounted on the housing and threadedly engages the cylindrical member. A supporting member is slidably mounted in the housing in an opposite relation with the cylindrical member for supporting the other side surface of the other end of the arm and a spring member is provided to urge the supporting member toward the other end of the arm.

5 Claims, 3 Drawing Figures

TAIL STOCK

BACKGROUND OF THE INVENTION

1. Field of the Invention

The present invention relates generally to tail stocks, and more particularly to an improved tail stock which is capable of compensating for undesired taper being machined on the outer periphery of a workpiece during a machining operation.

2. Description of the Prior Art

The taper compensation of a workpiece is conventionally accomplished by swinging the swivel table or by engaging a feeler of a dial indicator to observe the change of the pointer thereof for an endwise adjustment of the tail stock. These adjustments, however, require a well trained operator and much time.

SUMMARY OF THE INVENTION

It is an object of the present invention to provide a new and improved tail stock which is simple in construction and in operation.

Another object of the present invention is to provide a new and improved tail stock capable of effecting a taper compensation of the workpiece with high accuracy.

Briefly, according to the present invention, these and other objects are achieved by providing a tail stock for compensating for tapering of a workpiece to be machined which comprises a housing, a center sleeve slidably and rotatably mounted in the housing and provided at one end thereof with a bore with a predetermined eccentricity for holding a center, actuating means for sliding the center sleeve, an arm secured at one end thereof to the center sleeve, a cylindrical member mounted in the housing for slidably moving perpendicular to the sliding direction of the center sleeve and for abuttingly engaging one side surface of the other end of the arm, a feed screw shaft rotatably mounted on the housing, but being restrained from axial movement relative thereto, for a threaded engagement with the cylindrical member, a supporting member slidably mounted in the housing in an opposite relation with the cylindrical member for supporting the other side surface of the other end of the arm in cooperation with the cylindrical member, and resilient means for urging the supporting member in a direction to engage with the other side surface of the other end of the arm.

BRIEF DESCRIPTION OF THE DRAWINGS

The foregoing and other objects and many of the attendant advantages of the present invention will be more fully appreciated as the same becomes better understood by reference to the following detailed description when considered in connection with the accompanying drawings, in which.

DETAILED DESCRIPTION OF THE PREFERRED EMBODIMENT

Figure 1:
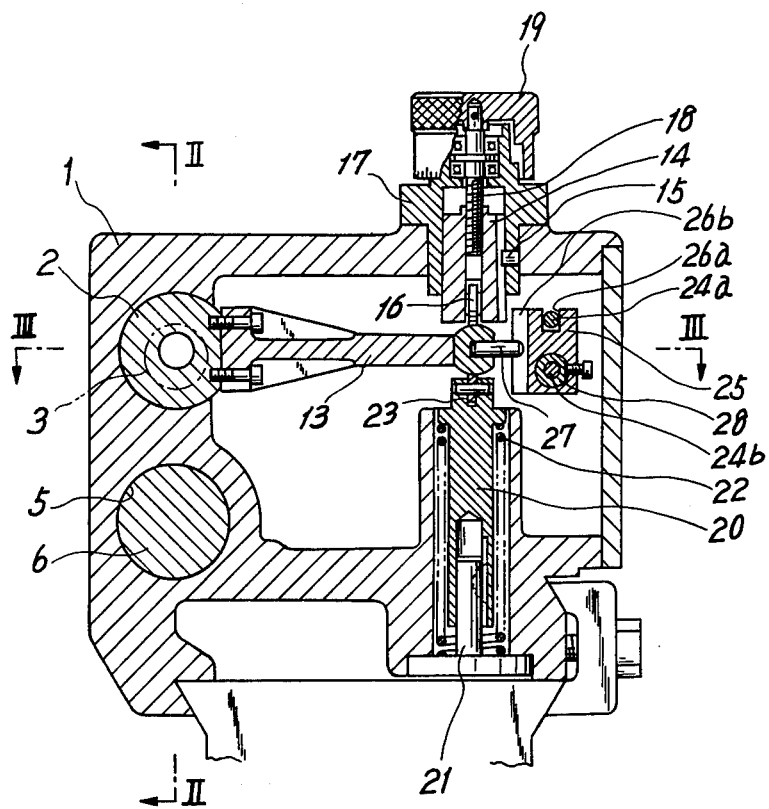
FIG. 1 is a sectional view of a tail stock according to the present invention.
Figure 2:
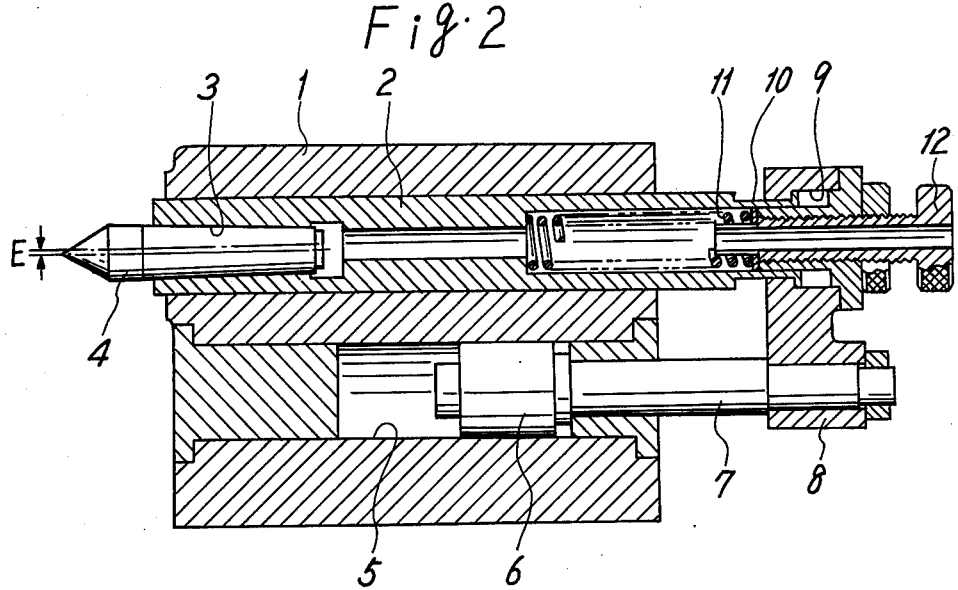
FIG. 2 is a sectional view taken along the lines II—II in FIG. 1.
Figure 3:
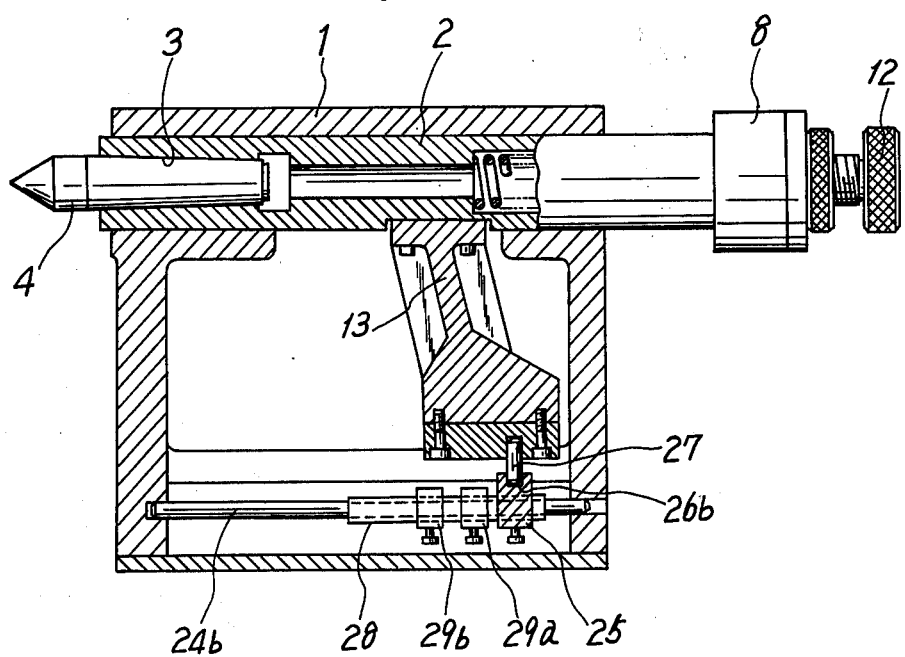
FIG. 3 is a sectional view taken along the lines III-—III in FIG. 1.

Referring now to the drawings, wherein like reference numerals or characters refer to identical or corresponding parts throughout the several views, and more particularly to FIGS. 1 and 2, there is shown a tail stock housing 1 within which a center sleeve 2 is slidably and rotatably mounted. The center sleeve 2 is provided at one end thereof with a center bore 3 for holding a center 4. The axis of the center bore 3 is eccentric from the axis of the center sleeve 2 by a predetermined amount E. Therefore, the position of the center 4 can be changed in accordance with any rotation of the center sleeve 2.

A hydraulic cylinder 5 having a piston 6 slidably disposed therein is mounted within the housing 1 in parallel relation with the center sleeve 2 for axially moving the center sleeve 2 toward and away from a workpiece, not shown. The piston 6 has a piston rod 7 integrally formed therewith and fixedly connected outside the cylinder 5 to a connecting member 8. The connecting member 8 is, in turn, connected with the center sleeve 2, at a reduced diameter portion, as shown in FIG. 2. Thus, the rear end 10 of the center sleeve 2 is slidably and rotatably received within a cylindrical bore 9 formed in the connecting member 8. A spring 11 is interposed in the center sleeve 2 to urge the center sleeve 2 in a forward direction or in a direction toward the workpiece, by means of a resilient force thereof against the connecting member 8, and an adjusting nut 12 is provided to adjust and set a desired resilient force of the spring 11.

An arm 13 is secured at one end thereof to a flat side surface formed on the outer periphery of the center sleeve 2. As shown in FIG. 1, a support sleeve 17 is fixed on the housing 1 and extends in a direction perpendicular to the extension of the arm 13. A cylindrical member 14 is slidably mounted in the support sleeve 17, but is restrained from rotation relative thereto by a pin 15 set within a slot formed longitudinally along the surface of the cylindrical member 14. One end of the cylindrical member 14 is in abutting engagement with one side surface of the other end of the arm 13 through a roller 16. A feed screw shaft 18 is arranged coaxially with the cylindrical member 14 and is threadedly engaged along one end within the cylindrical member 14, with its other end being rotatably supported by the support sleeve 17, though restrained from an axial movement relative thereto. A manually operated knob 19 is fixed on the end of the feed screw shaft 18 rotatably supported within the support sleeve 17, being provided with scale marks for indicating the degree of rotational movement thereof. A support member 20 is slidably mounted in the housing 1 in opposite relation with the cylindrical member 14. The support member 20 is in abutting engagement with the other side surface of the other end of the arm 13 through a roller 23. A guide shaft 21 is fixed to the housing 1 to guide the support member 20 and spring 22 is interposed between the guide shaft 21 and the support member 20 to urge the support member 20 into abutting engagement with the other end of the arm 13.

A pair of parallel pilot bars 24a and 24b are fixed in the housing 1 in the same direction as the axis of the center sleeve 2 at a position adjacent to the other end of the arm 13. An operating sleeve 28 is slidably mounted on the lower pilot bar 24b. On the periphery of the operating sleeve 28 are fixedly mounted a pair of dogs 29a and 29b for confirming the retracted and advanced ends of the center sleeve 2, respectively, and a slide member 25. The slide member 25 has two recessed grooves 26a and 26b in the top surface and the side surface confronting the other end of the arm 13, respectively. The upper pilot 24a is slidably received in the recessed groove 26a in the top surface of the slide member 25. The other recessed groove 26b is formed in a direction perpendicular to the recessed groove 26a and slidably receives a pin 27 projected from the other end of the arm 13.

The operation of the above-described tail stock will now be described. The axial movement of the center sleeve 2 is achieved by the advancing or retracting movement of the piston 6 within the cylinder 5. The center sleeve 2 is shown in a retracted position in FIG. 2. When the piston 6 is advanced by the operation of a change-over valve, not shown, the connecting member 8 is moved in a forward direction by means of the piston rod 7, thus causing a simultaneous sliding movement of the center sleeve 2, urged by the spring 11, in a forward direction. After the center 4 is moved into abutting engagement with the workpiece, by means of the advancing movement of the center sleeve 2, the advancing movement of the piston 6 is absorbed by the compression of the spring 11 and the relative sliding movement between the reduced portion at the rear end of the center sleeve 2 and the connecting member 8. The compression force of the spring 11 is adjusted and set to a desired amount by the adjusting nut 12.

The arm 13 is moved with the center sleeve 2 to thereby cause the slide member 25, connected to the other end of the arm 13 by means of the pin 27, to slide on the pilot bars 24a and 24b. Accordingly, the dog 29b fixed on the operating sleeve 28 and thus movable with the slide 25, actuates a limit switch, not shown, to thereby confirm the advanced end of the center sleeve 2 moved by the hydraulic cylinder 5.

Adjustment of the position on the center 4 for a taper compensation of the workpiece is easily and accurately performed by operating the knob 19 with the scale marks. Rotation of the knob 19 causes the feed screw shaft 18 to rotate in either direction to thereby correspondingly move the cylindrical member 14 a slight amount. The arm 13, which is always resiliently urged by the support member 20, is rotated by the slight movement of the cylindrical member 14. The slight rotation of the arm 13 causes the center sleeve 2 to rotate to thereby change the position of the center 4, which is eccentric by the predetermined amount about the axis of the center sleeve 2, so as to perform a taper compensation of the workpiece supported on the center 4.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A tail stock for compensating for tapering of a workpiece to be machined, comprising:
    a housing;
    a center sleeve slidably and rotatably mounted in said housing and provided at one end thereof with a bore with a predetermined eccentricity for holding a center;
    actuating means for sliding said center sleeve;
    an arm secured at one end thereof to the center sleeve;
    a cylindrical member mounted in said housing being slidable in a direction perpendicular to a sliding direction of said center sleeve and abuttingly engaging one side surface of the other end of said arm;
    a feed screw shaft rotatably mounted on said housing, but being restrained from axial movement relative thereto, and being threadedly engaged with said cylindrical member;
    a supporting member slidably mounted in said housing in an opposite relation with said cylindrical member for supporting the other side surface of the other end of said arm in cooperation with said cylindrical member; and
    resilient means for urging said supporting member in a direction to engage the other side surface of the other end of said arm.

2. A tail stock as set forth in claim 1, wherein said cylindrical member and said supporting member are provided with respective rollers abutting the other end of said arm.

3. A tail stock as set forth in claim 1, further comprising a manually operated knob connected to said feed screw shaft and provided with scale marks for indicating the degree of rotational movement thereof.

4. A tail stock as set forth in Claim 1, further comprising:
    a pin connected to the other end of said arm;
    a slide member having a recess which receives said pin therein in such a manner as to allow said arm to rotate; and
    guide means mounted in said housing for slidably but non-rotatably supporting said slide member for a sliding movement in a direction parallel to the axis of said center sleeve.

5. A tail stock as set forth in claim 4, further comprising a pair of dogs mounted on said slide member for confirming the sliding movement of said center sleeve.

* * * * *